United States Patent
Ono

(10) Patent No.: US 12,208,752 B2
(45) Date of Patent: Jan. 28, 2025

(54) IN-VEHICLE INFORMATION PROCESSING APPARATUS, PROGRAM EXECUTION RESTRICTION METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Norihiro Ono, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 264 days.

(21) Appl. No.: 17/756,255

(22) PCT Filed: Nov. 2, 2020

(86) PCT No.: PCT/JP2020/041101
§ 371 (c)(1),
(2) Date: May 19, 2022

(87) PCT Pub. No.: WO2021/100451
PCT Pub. Date: May 27, 2021

(65) Prior Publication Data
US 2022/0396218 A1    Dec. 15, 2022

(30) Foreign Application Priority Data
Nov. 20, 2019   (JP) ................................ 2019-209733

(51) Int. Cl.
*B60R 16/02*   (2006.01)
*G06F 21/10*   (2013.01)
(Continued)

(52) U.S. Cl.
CPC ............ *B60R 16/02* (2013.01); *G06F 21/121* (2013.01); *H04W 4/021* (2013.01); *G06F 21/1073* (2023.08)

(58) Field of Classification Search
CPC ... B60R 16/02; G06F 21/121; G06F 21/1073; G06F 2221/2111; H04W 4/021; H04W 4/029; G06Q 50/40
See application file for complete search history.

(56) References Cited

U.S. PATENT DOCUMENTS

| | | | | |
|---|---|---|---|---|
| 11,104,349 B1* | 8/2021 | Leung | .................... | B60W 40/09 |
| 2005/0282519 A1* | 12/2005 | Kobayashi | ............. | G06Q 30/06 |
| | | | | 455/408 |

(Continued)

FOREIGN PATENT DOCUMENTS

| | | |
|---|---|---|
| JP | H11-212784 A | 8/1999 |
| JP | 2010-205185 A | 9/2010 |

OTHER PUBLICATIONS

International Search Report, Application No. PCT/JP2020/041101, mailed Dec. 8, 2020. ISA/Japan Patent Office.

*Primary Examiner* — Jason Holloway
*Assistant Examiner* — Madison B Emmett
(74) *Attorney, Agent, or Firm* — Honigman LLP

(57) ABSTRACT

Provided are an in-vehicle information processing apparatus, a program execution restriction method and a computer program that can be expected to provide users with an opportunity to fully use the trial version of an application program. An in-vehicle information processing apparatus according to one embodiment is an in-vehicle information processing apparatus to be mounted in a vehicle and for executing a program, the apparatus including a processing unit, whereby the processing unit determines whether the travel distance of the vehicle from when usage of the program is started exceeds a threshold value, and, if it is (Continued)

determined that the travel distance exceeds the threshold value, restricts subsequent execution of the program. The processing unit of the in-vehicle information processing apparatus may acquire the program and information relating to the threshold value from a device provided externally to the vehicle.

7 Claims, 5 Drawing Sheets

(51) Int. Cl.
*G06F 21/12* (2013.01)
*H04W 4/021* (2018.01)

(56) References Cited

U.S. PATENT DOCUMENTS

| | | | |
|---|---|---|---|
| 2008/0275764 A1* | 11/2008 | Wilson | G06Q 30/0205 705/7.29 |
| 2011/0144852 A1 | 6/2011 | Kobayashi | |
| 2014/0109080 A1* | 4/2014 | Ricci | G06F 8/61 717/174 |
| 2014/0199962 A1* | 7/2014 | Mohammed | H04M 15/8033 455/406 |
| 2016/0316358 A1* | 10/2016 | Orr | H04W 8/22 |
| 2018/0349975 A1* | 12/2018 | Lee | G07C 5/0808 |
| 2019/0005763 A1* | 1/2019 | Odinak | G07B 15/02 |
| 2020/0186620 A1* | 6/2020 | Golgiri | B60W 30/16 |
| 2022/0108337 A1* | 4/2022 | Zhang | H04L 67/12 |
| 2022/0303381 A1* | 9/2022 | Phillips | G06Q 30/0641 |
| 2023/0110969 A1* | 4/2023 | Luvö | H04W 4/70 705/39 |
| 2023/0325168 A1* | 10/2023 | Lewandowski | B60W 40/09 717/118 |

* cited by examiner

IN-VEHICLE INFORMATION PROCESSING APPARATUS, PROGRAM EXECUTION RESTRICTION METHOD, AND COMPUTER PROGRAM

CROSS-REFERENCE TO RELATED APPLICATIONS

This application is the U.S. national stage of PCT/JP2020/041101 filed on Nov. 2, 2020, which claims priority of Japanese Patent Application No. JP 2019-209733 filed on Nov. 20, 2019, the contents of which are incorporated herein.

TECHNICAL FIELD

The present disclosure relates to an in-vehicle information processing apparatus, a program execution restriction method and a computer program for restricting execution of programs in a vehicle.

BACKGROUND

In recent years, in-vehicle information processing apparatuses that are mounted in vehicles have become highly functional, and it has become possible for users to select application programs according to their personal preferences and install the selected application programs on the in-vehicle information processing apparatuses. Companies, organizations and the like that are involved in production, provision and so on of application programs may provide users with a trial version of an application program in order to encourage users to purchase the application program. Conventionally, with the trial version of an application program, restrictions are placed on usage by the user of the full version of the application program with a method such as restricting the usage period or restricting usage of some of the functions, for example.

JP 11-212784A proposes an in-vehicle terminal device that restricts the usage period of software that is executed, based on the number of times an OFF operation signal of the ignition switch of the vehicle is counted.

In the case where restrictions are placed on the usage period in the trial version of an application program, the usage period may lapse before the user has fully used the application program. In the case where restrictions are placed on usage of some of the functions in the trial version of an application program, the user cannot use all of the functions. Also, in the case where the trial version of an application program is restricted based on the number of times the ignition switch is turned off, as with the in-vehicle terminal device according to JP 11-212784A, users who, for example, take more breaks while driving will have less opportunity to use the trial version, and will not be able to fully experience the application program.

The present disclosure has been made in view of such circumstances, and an object thereof is to provide an in-vehicle information processing apparatus, a program execution restriction method and a computer program that can be expected to provide users with an opportunity to fully use the trial version of an application program.

SUMMARY

An in-vehicle information processing apparatus according to one mode is an in-vehicle information processing apparatus to be mounted in a vehicle and for executing a program, the apparatus including a processing unit, whereby the processing unit determines whether a travel distance of the vehicle from when usage of the program is started exceeds a threshold value, and, if it is determined that the travel distance exceeds the threshold value, restricts subsequent execution of the program.

The instant disclosure can be realized not only as an apparatus such as an in-vehicle information processing apparatus that includes such a characteristic processing unit, but also as a program execution restriction method that includes the characteristic processing as steps, or as a computer program for causing a computer to execute these steps. The instant disclosure can also be realized as a semiconductor integrated circuit that realizes some or all of these devices, or as another device or system that includes these devices.

Advantageous Effects

According to the above, it can be expected that users will be provided an opportunity to fully use the trial version of an application program.

DETAILED DESCRIPTION OF PREFERRED EMBODIMENTS

Figure 1:
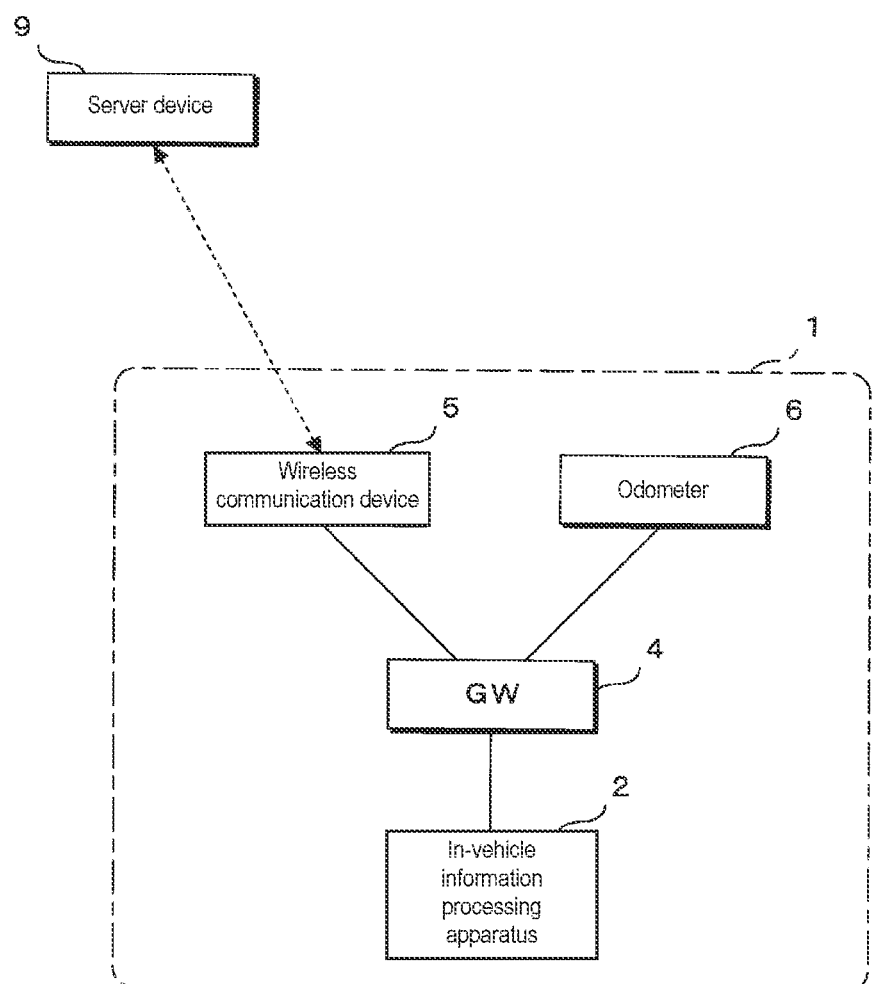
FIG. 1 is a schematic diagram for illustrating the configuration of an in-vehicle information processing system according to a first embodiment.

First, modes for carrying out the disclosure will be enumerated and described. At least some of the modes described below may be discretionarily combined.

Mode (1)

In mode (1), an in-vehicle information processing apparatus according to one mode is an in-vehicle information processing apparatus to be mounted in a vehicle and for executing a program, the apparatus including a processing unit, whereby the processing unit determines whether a travel distance of the vehicle from when usage of the program is started exceeds a threshold value, and, if it is determined that the travel distance exceeds the threshold value, restricts subsequent execution of the program.

In this mode, an in-vehicle information processing apparatus that executes a program such as a trial version of an application program acquires the distance that the vehicle has traveled from when usage of the program was started, determines whether the acquired travel distance exceeds a threshold value, and restricts subsequent execution of the program, if it is determined that the travel distance exceeds the threshold value. The in-vehicle information processing apparatus is thereby able to make the program available to the user until the travel distance of the vehicle exceeds the threshold value. By setting the travel distance of the vehicle as the restriction condition, the restriction condition of the program will not be reached during a period in which the vehicle is not being used. The state in which the travel distance of the vehicle is increasing is a state in which the user is using the vehicle, and in which the user is able to use this program. Therefore, the in-vehicle information processing apparatus is able to provide the user with an opportunity to fully use the program.

Mode (2)

Preferably, in mode (2), the processing unit acquires the program and information relating to the threshold value from a device provided externally to the vehicle.

In mode (2), the in-vehicle information processing apparatus acquires the program and information relating to the threshold value serving as a restriction condition from a device provided externally to the vehicle. The in-vehicle information processing apparatus is, for example, thereby able to acquire a program from an external device according to the preferences of the user and execute the acquired program, and to restrict execution of the program using information relating to a threshold value acquired together with this program.

Mode (3)

Preferably, in mode (3), the processing unit determines whether position information of the vehicle indicates a specific position, and, if it is determined that the travel distance exceeds the threshold value, and it is determined that the position information indicates the specific position, restricts subsequent execution of the program.

In mode (3), the in-vehicle information processing apparatus acquires position information of the vehicle and determines whether the acquired position information indicates a specific position. The in-vehicle information processing apparatus restricts subsequent execution of the program, if it is determined that the travel distance exceeds the threshold value, and it is determined that the position information is the specific position. By including a position information condition in the program execution restrictions in addition to the travel distance condition, execution of the program being restricted due to the travel distance exceeding the threshold value while the vehicle is traveling, for example, can be prevented. For example, the position of the user's home, a destination position set in a car navigation device, or the position where the program was acquired can be employed as the specific position.

Mode (4)

Preferably, in mode (4), the processing unit determines whether an elapsed time from a point in time at which it is determined that the travel distance exceeds the threshold value exceeds a predetermined time period, and, if it is determined that the elapsed time exceeds the predetermined time period, restricts subsequent execution of the program, even if it is not determined that the position information indicates the specific position.

In mode (4), the in-vehicle information processing apparatus acquires the elapsed time from the point in time at which it is determined that the travel distance exceeds the threshold value, and determines whether the acquired elapsed time exceeds a predetermined time period. The in-vehicle information processing apparatus restricts subsequent execution of the program in the case where the elapsed time from when the travel distance exceeds the threshold value exceeds the predetermined time period, even if the position information of the vehicle does not indicate the specific position. The in-vehicle information processing apparatus is thereby able to prevent a state where execution of the program cannot be restricted due to the vehicle not reaching the specific position from continuing for longer than necessary.

Mode (5)

Preferably, in mode (5), the processing unit restricts execution such that the program is unavailable for usage.

In mode (5), the in-vehicle information processing apparatus restricts the program so as to be unavailable to the user, in the case where the restriction condition is satisfied. For example, the in-vehicle information processing apparatus may apply restrictions by not executing the program. The in-vehicle information processing apparatus is thereby able to make a program unavailable to the user if the restriction condition is satisfied, and to provide this program to the user as a trial version with restricted usage conditions.

Mode (6)

In mode (6), a program execution restriction method according to one aspect is a program execution restriction method for restricting execution of a program by an in-vehicle information processing apparatus mounted in a vehicle, the method including determining whether a travel distance of the vehicle from when usage of the program is started exceeds a threshold value, and if it is determined that the travel distance exceeds the threshold value, restricting subsequent execution of the program.

In mode (6), similarly to mode (1), the user can be given an opportunity to fully use the program.

Mode (7)

In mode (7), a computer program according to one aspect causes a computer mounted in a vehicle to execute processing for determining whether a travel distance of the vehicle from when usage of the program is started exceeds a threshold value, and, if it is determined that the travel distance exceeds the threshold value, restricting subsequent execution of the program.

In mode (7), similarly to mode (1), the user can be given an opportunity to fully use the program.

Specific examples of an in-vehicle information processing apparatus according to embodiments of the present disclosure will be described below with reference to the drawings. The present disclosure is not restricted to these illustrative examples and is defined by the claims, and all changes that come within the meaning and range of equivalency of the claims are intended to be embraced therein.

First Embodiment

FIG. 1 is a schematic diagram for illustrating the configuration of an in-vehicle information processing system according to the present embodiment. The in-vehicle information processing system according to the present embodiment is constituted to include an in-vehicle information processing apparatus 2 mounted in a vehicle 1, a GW (gateway) 4, a wireless communication device 5 and an odometer 6. The in-vehicle information processing apparatus 2 is a device that is provided in the vicinity of the driver's seat of the vehicle 1, for example, and provides various services to the user of the vehicle 1.

The GW 4 is a device that relays communication inside the vehicle 1. In the present embodiment, devices such as the in-vehicle information processing apparatus 2, the wireless communication device 5 and the odometer 6 are connected to the GW 4, and the GW 4 relays communication between these plurality of devices. The wireless communication device 5 communicates with a server device 9 provided externally to the vehicle 1, by wireless communication such as a mobile phone communication network or a wireless LAN (Local Area Network), for example. The odometer 6 is a device for measuring the travel distance of the vehicle 1. The server device 9 is a device for distributing various application programs (hereinafter, referred to as apps) that are executed by the in-vehicle information processing apparatus 2.

In the in-vehicle information processing system according to the present embodiment, the user of the vehicle 1 is able to download various apps from the server device 9 by operating the in-vehicle information processing apparatus 2, and to use the downloaded apps by executing the apps on the in-vehicle information processing apparatus 2. The apps distributed by the server device 9 may be either paid or free. In the present embodiment, the server device 9 is able to distribute a trial version app of paid apps with restricted usage conditions.

In the in-vehicle information processing system according to the present embodiment, restrictions conditional on the travel distance of the vehicle 1 are placed on the trial version app. For example, the trial version app allows the user to freely use all functions until the vehicle 1 travels 100 km from when the app is installed, and the app becomes unavailable at the stage where the travel distance reaches 100 km. In the case where the travel distance of the vehicle 1 that is acquired from the odometer 6 reaches a predetermined threshold value, the in-vehicle information processing apparatus 2 makes the installed trial version app unavailable for usage (stops the app or does not start the app) after that time.

Figure 2:
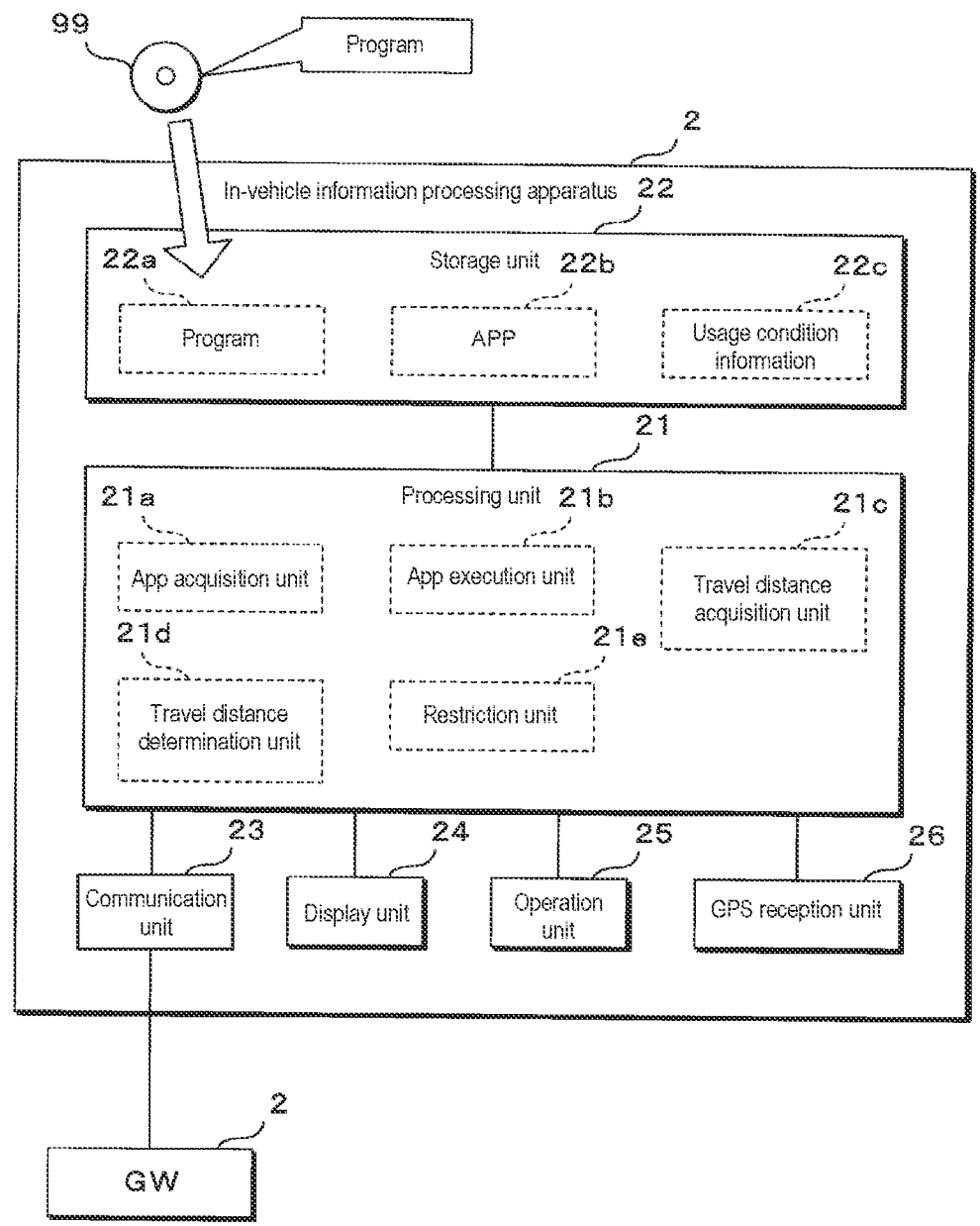
FIG. 2 is a block diagram showing the configuration of an in-vehicle information processing apparatus according to the first embodiment.

FIG. 2 is a block diagram showing the configuration of the in-vehicle information processing apparatus 2 according to the first embodiment. The in-vehicle information processing apparatus 2 according to the present embodiment is constituted to include a processing unit (processor) 21, a storage unit (storage) 22, a communication unit (transceiver) 23, a display unit (display) 24, an operation unit 25, and a GPS (Global Positioning System) reception unit 26.

The processing unit 21 is constituted using a computational processing apparatus such as a CPU (Central Processing Unit) or an MPU (Micro-Processing Unit), for example. The processing unit 21 is able to perform various processing, by reading out and executing programs stored in the storage unit 22. In the present embodiment, the processing unit 21 provides various services to the user of the vehicle 1, by reading out and executing an app 22b stored in the storage unit 22. Also, the processing unit 21 performs various processing such as processing for acquiring apps from the server device 9 and processing for restricting usage of trial version apps, by reading out and executing a program 22a stored in the storage unit 22.

The storage unit 22 is constituted using a nonvolatile memory device such as a flash memory or an EEPROM (Electrically Erasable Programmable Read-Only Memory), for example. The storage unit 22 stores various programs that are executed by the processing unit 21 and various data required in processing that is performed by the processing unit 21. In the present embodiment, the storage unit 22 stores the program 22a and the app 22b that are executed by the processing unit 21 and usage condition information 22c of the app 22b.

In the present embodiment, the program 22a is a computer program that performs processing at a lower level than application programs, such as an operating system or firmware, for example. The program 22a mediates between hardware of the in-vehicle information processing apparatus 2 and the app 22b, and provides the execution environment of the app 22b. Note that the program 22a may be written to the storage unit 22 at the manufacturing stage of the in-vehicle information processing apparatus 2, for example, or the in-vehicle information processing apparatus 2 may acquire, through communication, a program that is distributed by a remote server device or the like, for example, or the in-vehicle information processing apparatus 2 may read out a program recorded on a recording medium 99 such as a memory card or optical disk and store this program in the storage unit 22, for example, or a writing device may read out a program recorded on the recording medium 99 and write this program to the storage unit 22 of the in-vehicle information processing apparatus 2, for example. The program 22a may be provided in a mode of being distributed via a network, or may be provided in a mode of being recorded on the recording medium 99.

The app 22b is an application program that provides a service to the user of the vehicle 1 or performs processing such as travel control of the vehicle 1, and is a computer program that performs processing at a higher level than the program 22a. In the illustrated example, one app 22b is stored in the storage unit 22, but a plurality of types of apps 22b may be stored in the storage unit 22 of the in-vehicle information processing apparatus 2.

The usage condition information 22c is information relating to the conditions for restricting usage of the app 22b. In the present embodiment, usage restrictions that depend on the travel distance of the vehicle 1 are applied to the trial version app 22b. Information on the travel distance for which usage of the trial version app is allowed, that is, information on the travel distance serving as a threshold value for restricting usage of the trial version app, is stored in the storage unit 22 as the usage condition information 22c.

In the present embodiment, the in-vehicle information processing apparatus 2 acquires (downloads) the app 22b and the usage condition information 22c from the server device 9 external to the vehicle 1 and stores the acquired app 22b and usage condition information 22c in the storage unit 22. An acquisition request for the app 22b is transmitted from the in-vehicle information processing apparatus 2 to the external server device 9 via the GW 4 and the wireless communication device 5. In response to this acquisition request, the server device 9 transmits the requested app 22b to the vehicle 1, and transmits the usage condition information 22c relating to the app 22b to the vehicle 1. The app 22b and the usage condition information 22c transmitted from the server device 9 are received by the in-vehicle information processing apparatus 2 via the wireless communication device 5 and the GW 4 and stored in the storage unit 22. Note that the app 22b and the usage condition information 22c may be provided in a mode of being recorded on a recording medium, rather than being acquired by the in-vehicle information processing apparatus 2 from the server device 9 through communication.

The communication unit 23 is connected to a communication line constituting a network inside the vehicle 1, and communicates with in-vehicle devices such as the GW 4 via the internal network. In the present embodiment, the communication unit 23 transmits and receives messages, in accordance with a communication standard such as Ethernet (registered trademark) or CAN (Controller Area Network). The communication unit 23 can be constituted using an IC (Integrated Circuit) such as an Ethernet PHY (PHYsical layer) IC or a CAN controller IC. The communication unit 23 performs data transmission by outputting data provided from the processing unit 21 to the communication line as electrical signals. Also, the communication unit 23 converts the electrical signals on the communication line into digital data, by acquiring the potential of the communication line through sampling, and provides the converted data to the processing unit 21 as reception data.

The display unit 24 is constituted using a display device such as a liquid crystal panel, for example, and displays various images in accordance with instructions from the processing unit 21. The display unit 24 performs various display such as displaying menus, icons or the like for the user to perform operations and displaying messages to the user.

The operation unit 25 is constituted using a touch panel, mechanical buttons or the like, for example. The operation unit 25 receives operations by the user and provides information that depends on the received operations to the processing unit 21.

The GPS reception unit 26 receives radio waves that are transmitted from GPS satellites and provides information that is included in the received radio waves to the processing unit 21. The processing unit 21 is able to perform processing for specifying the position (e.g., latitude and longitude) of the vehicle 1, based on the information provided from the GPS reception unit 26. Note that, in the present embodiment, the processing unit 21 is configured to specify the position of the vehicle 1 based on the reception information of the GPS reception unit 26, but the disclosure is not limited thereto, and the processing unit 21 may specify the position of the vehicle 1 using information that is obtained from sensors such as a vehicle speed sensor, an acceleration sensor and a gyro sensor in addition to the GPS reception information.

Also, in the in-vehicle information processing apparatus 2 according to the present embodiment, an app acquisition unit 21a, an app execution unit 21b, a travel distance acquisition unit 21c, a travel distance determination unit 21d, a restriction unit 21e and the like are realized as software-like functional units by the processing unit 21, as a result of the processing unit 21 reading out and executing the program 22a stored in the storage unit 22. The travel distance acquisition unit 21c, the travel distance determination unit 21d and the restriction unit 21e may, however, be functional units that are realized by execution of the app 22b.

The app acquisition unit 21a performs processing for acquiring (downloading) the app 22b that is distributed by the server device 9, by communicating with the external server device 9 using the wireless communication device 5 mounted in the vehicle 1. The app acquisition unit 21a acquires list information of apps that are distributed by the server device 9 by communicating with the server device 9, displays an app list on the display unit 24, and receives selection of an app to be downloaded from the user with the operation unit 25. The app acquisition unit 21a gives a transmission request for the selected app to the server device 9, receives the app 22b that is transmitted from the server device 9 in response to this request, and stores the received app 22b in the storage unit 22. Also, the app acquisition unit 21a acquires the usage condition information 22c for the trial version app 22b that is transmitted together with the app 22b from the server device 9 and stores the acquired usage condition information 22c in the storage unit 22.

The app execution unit 21b performs processing related to execution of the app 22b stored in the storage unit 22. The app execution unit 21b performs processing for starting and stopping the app 22b, and managing the execution schedule of a plurality of apps 22b, for example.

The travel distance acquisition unit 21c performs processing for acquiring the travel distance of the vehicle 1, by communicating with the odometer 6 of the vehicle 1 using the communication unit 23. Note that, in the present embodiment, the travel distance acquisition unit 21c acquires the total travel distance of the vehicle 1, but the disclosure is not limited thereto, and the travel distance from the point in time at which the app 22b is downloaded or first executed (i.e., point in time at which usage of the app 22b is started), for example, may be acquired. The travel distance acquisition unit 21c acquires the travel distance at the point in time at which the app 22b is downloaded or first executed, repeatedly acquires the travel distance at predetermined periods (e.g., every several seconds to every tens of seconds) from at least this point in time, and provides the acquired travel distance to the travel distance determination unit 21d.

The travel distance determination unit 21d performs processing for determining whether the condition relating to the travel distance of the vehicle 1 for restricting usage of the trial version app 22b is satisfied. The travel distance determination unit 21d sets the travel distance of the vehicle 1 at the point in time at which usage of the trial version app 22b is started (point in time at which the trial version app 22b is downloaded or first executed, etc.) as the initial value. In the usage condition information 22c of the storage unit 22, the distance for which each app 22b is useable is stored as a condition, and the travel distance determination unit 21d calculates a value obtained by adding the distance serving as a usage condition to the initial value of the travel distance as the threshold value of the restriction. Thereafter, the travel distance determination unit 21d determines whether to restrict usage of the trial version app 22b, by determining whether the travel distance of the vehicle 1 periodically acquired by the travel distance acquisition unit 21c exceeds this threshold value.

The restriction unit 21e performs processing for restricting usage of the app 22b, in the case where the travel distance determination unit 21d determines that the travel distance of the vehicle 1 exceeds the threshold value. The restriction unit 21e may restrict usage by prohibiting starting of the app 22b, for example, or may restrict usage by deleting (uninstalling) the app 22b from the storage unit 22, for example, or may restrict usage by a method other than these. Execution of the app 22b may be restricted by the restriction unit 21e with any method. In the present embodiment, the restriction unit 21e restricts execution such that the user is unable to use any of the functions of the app 22b, but the disclosure is not limited thereto, and execution may be restricted such that only some of the functions of the app 22b are not available. Also, the restriction unit 21e may display the fact that usage of the app 22b has been restricted due to the travel distance of the vehicle 1 exceeding the threshold value as a message on the display unit 24, and may prompt the user to perform an operation such as formally purchasing the trial version app 22b.

Figure 3:
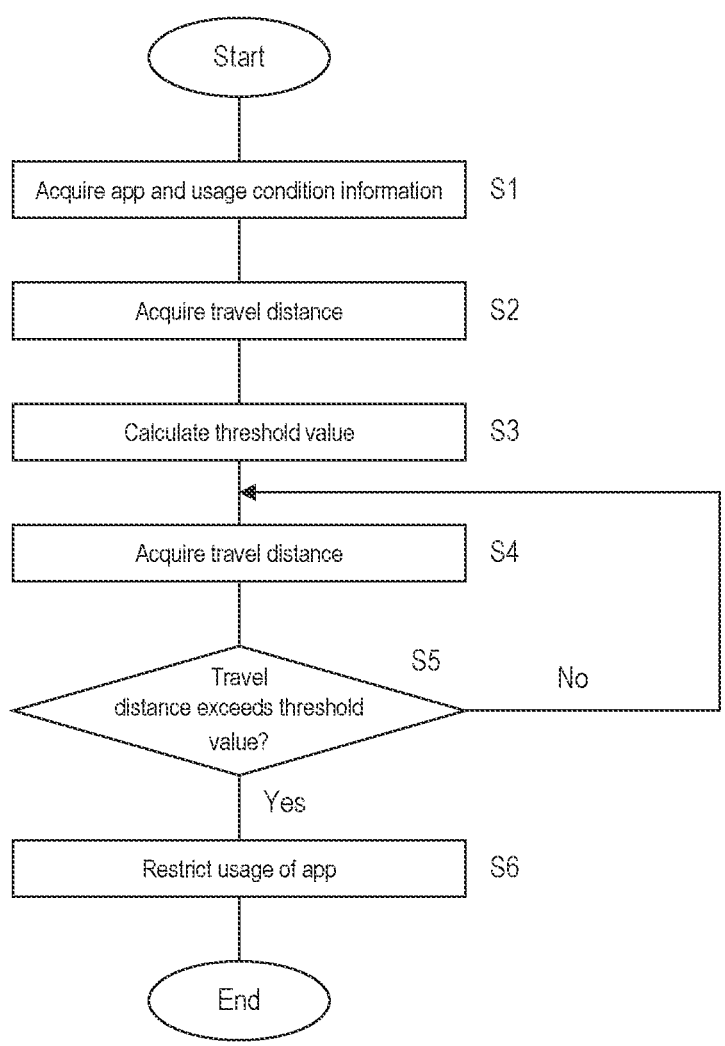
FIG. 3 is a flowchart showing the procedure of processing that is performed by the in-vehicle information processing apparatus according to the first embodiment.

FIG. 3 is a flowchart showing the procedure of processing that is performed by the in-vehicle information processing apparatus 2 according to the first embodiment. The app acquisition unit 21a of the processing unit 21 of the in-vehicle information processing apparatus 2 according to the present embodiment communicates with the server device 9 based on operations by the user, for example, and acquires the trial version app 22b and the usage condition information 22c of the app 22b from the server device 9 (step S1). The app 22b and the usage condition information 22c are stored in the storage unit 22.

The travel distance acquisition unit 21c of the processing unit 21 acquires, from the odometer 6 of the vehicle 1, the travel distance of the vehicle 1 at the point in time at which the trial version app 22b was acquired (step S2). The travel distance determination unit 21d of the processing unit 21 calculates a threshold value for performing determination of the travel distance related to usage restrictions, by setting the travel distance acquired in step S2 as the initial value and adding the distance for which the app 22b is usable prescribed in the usage condition information 22c to the initial value (step S3).

Thereafter, the travel distance determination unit 21d acquires the travel distance of the vehicle 1 from the odometer 6 (step S4). The travel distance determination unit 21d determines whether the travel distance acquired in step S4 exceeds the threshold value calculated in step S3 (step S5). If the travel distance does not exceed the threshold value (S5: NO), the processing unit 21 returns the processing to step S4, and travel distance acquisition by the travel distance acquisition unit 21c and determination of the travel distance by the travel distance determination unit 21d are repeated.

If the travel distance exceeds the threshold value (S5: YES), the restriction unit 21e of the processing unit 21 restricts usage of the trial version app 22b acquired in step S1 (step S6), and ends the processing. At this time, the restriction unit 21e stops execution if the app 22b is being executed, and prohibits subsequent starting of the app 22b. Also, the restriction unit 21e may display a message on the display unit 24 to the effect that the trial version app 22b is no longer available.

Note that the illustrated processing could possibly be interrupted due to the ignition switch of the vehicle 1 being switched OFF, for example. In the case where such an interruption occurs, the in-vehicle information processing apparatus 2 need only resume the processing when the ignition switch is switched ON, for example, and the resumption of processing can take place from step S4 of the illustrated flowchart.

The in-vehicle information processing apparatus 2 according to the present embodiment having the above configuration acquires the travel distance of the vehicle 1 from when usage of the trial version app 22b was started, and determines whether the acquired travel distance exceeds the threshold value. The in-vehicle information processing apparatus 2 restricts subsequent usage of the app 22b, if it is determined that the travel distance of the vehicle 1 exceeds the threshold value. The in-vehicle information processing apparatus 2 is thereby able to allow the user to use the app 22b until the travel distance of the vehicle 1 exceeds the threshold value. By setting the travel distance of the vehicle 1 as the restriction condition, usage of the app 22b will not be restricted during periods such as when the vehicle 1 is not being used. A state in which the travel distance of the vehicle 1 is increasing is a state in which the user is using the vehicle 1, and in which the user is able to use the app 22b. Therefore, the in-vehicle information processing apparatus 2 is able to provide the user with an opportunity to fully use the app 22b.

Also, the in-vehicle information processing apparatus 2 according to the present embodiment acquires the app 22b and the usage condition information 22c from the server device 9 provided externally to the vehicle 1, and stores the acquired app 22b and usage condition information 22c in the storage unit 22. The in-vehicle information processing apparatus 2 is, for example, thereby able to acquire an app 22b from the external server device 9 according to the preferences of the user and execute the acquired app 22b. Also, the in-vehicle information processing apparatus 2 is able to calculate a threshold value for the travel distance determination unit 21d to perform determination of the travel distance, based on the condition of the travel distance for which the app 22b can be used prescribed in the usage condition information 22c, and is able to determine whether to restrict execution of the app 22b using this threshold value.

Also, the in-vehicle information processing apparatus 2 according to the present embodiment applies restrictions such that the user is no longer able to use the app 22b, if the travel distance of the vehicle 1 exceeds the threshold value. The in-vehicle information processing apparatus 2 is thereby able make an app 22b whose restriction condition has been reached unavailable, and to provide an app 22b to the user as a trial version with restricted usage conditions.

Note that, in the present embodiment, the in-vehicle information processing apparatus 2 performs processing such as performing determination of the travel distance and restricting usage of the app 22b, but processing such as performing determination of the travel distance and restricting usage of the app 22b may be performed by another device included in the in-vehicle information processing system such as the GW 4, for example. Also, in the present embodiment, the program 22a of the in-vehicle information processing apparatus 2 is configured to perform determination of the travel distance and to restrict execution of the app 22b, but the disclosure is not limited thereto, and determination of the travel distance and restriction of execution may be performed by the app 22b itself. Also, the in-vehicle information processing apparatus 2 applies restrictions to the app 22b at the point in time at which the travel distance of the vehicle 1 exceeds the threshold value, but a warning message may be displayed to the user at a point in time before the travel distance exceeds the threshold value.

Also, the in-vehicle information processing apparatus 2 according to the present embodiment applies restrictions to the app 22b in the case where the travel distance of the vehicle 1 exceeds the threshold value, regardless of whether the app 22b is being executed, but the disclosure is not limited thereto. A configuration may be adopted in which the in-vehicle information processing apparatus 2 adds the travel distance of the vehicle 1 only when the app 22b is being executed, for example, and applies restrictions to the app 22b in the case where the total value of the travel distance exceeds a predetermined distance set for each app 22b.

Also, in the present embodiment, the in-vehicle information processing apparatus 2 calculates a threshold value that is compared with the travel distance, based on the usage condition information 22c acquired together with the app 22b, but the disclosure is not limited thereto. For example, when usage of the app 22b is started, the in-vehicle information processing apparatus 2 may require the user to input information such as a destination and transit points, calculate a prediction value of the travel distance from the current position to the destination, and calculate a threshold value based on this prediction value. The prediction value of the travel distance can be calculated from a route derived by a car navigation device, for example, and is preferably a value provided with a certain margin in consideration of detours by the user and other factors. Also, the prediction value of the travel distance may be a round-trip travel distance, rather than one way from the current position to the destination.

Second Embodiment

An in-vehicle information processing apparatus 2 according to a second embodiment applies restrictions that are based on position information of the vehicle 1 and the passage of time, in addition to restrictions based on the travel distance of the vehicle 1. The in-vehicle information processing apparatus 2 according to the second embodiment determines whether the travel distance of the vehicle 1 exceeds a threshold value, similarly to the in-vehicle information processing apparatus 2 according to the first embodiment. The in-vehicle information processing apparatus 2 according to the second embodiment does not, however, restrict usage of the app 22b when the travel distance exceeds the threshold value, but restrict usage of the app 22b when the travel distance exceeds the threshold value and the vehicle 1 is in a predetermined position. Note that the predetermined position can be a position registered as the user's home or a position at which usage of the app 22b was started, for example, and may be a surrounding range of positions that includes such a specific position.

After determining that the travel distance exceeds the threshold value, the in-vehicle information processing apparatus 2 repeatedly acquires the position information of the vehicle 1 and repeatedly determines whether the position of the vehicle 1 is the predetermined position. The in-vehicle information processing apparatus 2 restricts usage of the app 22b, if it is determined that the position of the vehicle 1 is the predetermined position. It is thereby possible to prevent the app 22b from becoming unavailable while the vehicle 1 is traveling, for example, due to the travel distance exceeding the threshold value.

In the case where the state in which the position of the vehicle 1 is not the predetermined position continues for a long period of time, however, the user will be able to use the trial version app 22b for longer than necessary. In view of this, the in-vehicle information processing apparatus 2 according to the second embodiment starts measuring elapsed time with a timer from the point in time at which the travel distance exceeded the threshold value, and, if the elapsed time exceeds a predetermined time period, restricts usage of the app 22b regardless of the position of the vehicle 1. A time period such as 24 hours or one week, for example can be set as the predetermined time period.

Figure 4:
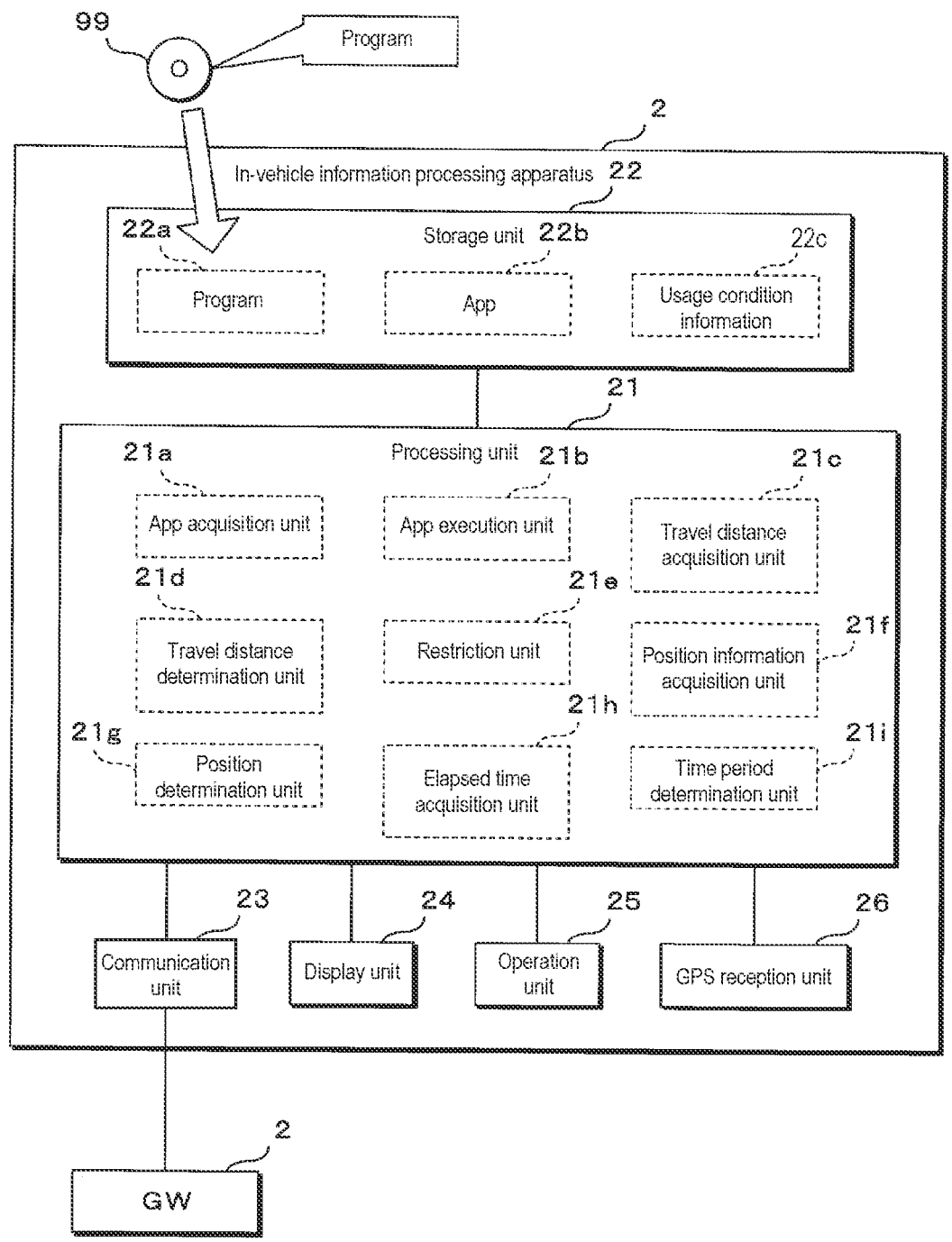
FIG. 4 is a block diagram showing the configuration of an in-vehicle information processing apparatus according to a second embodiment.

FIG. 4 is a block diagram showing the configuration of the in-vehicle information processing apparatus 2 according to the second embodiment. The in-vehicle information processing apparatus 2 according to the second embodiment is constituted by adding a position information acquisition unit 21f, a position determination unit 21g, an elapsed time acquisition unit 21h and a time period determination unit 21i to the configuration of the in-vehicle information processing apparatus 2 according to the first embodiment shown in FIG. 2. The position information acquisition unit 21f, the position determination unit 21g, the elapsed time acquisition unit 21h and the time period determination unit 21i are software-like functional units that are realized as a result of the processing unit 21 executing a program 22a or an app 22b according to the second embodiment.

The position information acquisition unit 21f performs processing for acquiring the position (e.g., latitude and longitude) of the vehicle 1, based on GPS signals received by the GPS reception unit 26. Note that the position information acquisition unit 21f may acquire the position of the vehicle 1 using information that is obtained from sensors such as a vehicle speed sensor, an acceleration sensor and a gyro sensor in addition to information of the GPS signals. Also, the position information of the vehicle 1 may be specified by another device mounted in the vehicle 1, in which case the in-vehicle information processing apparatus 2 acquires position information from the other device through communication. The position information acquisition unit 21f periodically repeats acquisition of the position information, at least after the travel distance determination unit 21d determines that the travel distance of the vehicle 1 exceeds the threshold value, and provides the acquired position information to the position determination unit 21g.

The position determination unit 21g performs processing for determining whether the position information of the vehicle 1 acquired by the position information acquisition unit 21f matches specific position information set in advance. The position of the user's home, for example, is used as specific position information. The position determination unit 21g may acquire the home position set in the car navigation device and set the acquired home position as the specific position information for use in determination, for example, or may request the user to input his or her home address or postal code at the point in time at which the app 22b is acquired, and determine specific position information based on the input address or postal code, for example. Also, the position determination unit 21g may set a position such as where the app 22b is acquired as the specific position information, for example, rather than the home position of the user. The position determination unit 21g determines whether the position information of the vehicle 1 matches the set specific position information, after the travel distance determination unit 21d determines that the travel distance of the vehicle 1 exceeds the threshold value. A certain range of errors may, however, be taken into consideration in determining whether these two pieces of position information match.

The elapsed time acquisition unit 21h performs processing for acquiring the elapsed time from the point in time at which the travel distance determination unit 21d determines that the travel distance of the vehicle 1 exceeds the threshold value. The elapsed time acquisition unit 21h measures the elapsed time using a timer function that the processing unit 21 is provided with, for example. The elapsed time acquisition unit 21h starts measuring the elapsed time with the timer if the travel distance determination unit 21d determines that the travel distance of the vehicle 1 exceeds the threshold value. The elapsed time acquisition unit 21h acquires the result of measuring the elapsed time with the timer, and provides the elapsed time to the time period determination unit 21i.

The time period determination unit 21i performs processing for determining whether the elapsed time acquired by the elapsed time acquisition unit 21h exceeds a predetermined time period. A time period such as 24 hours or one week, for example, is set in advance as the predetermined time period for use in the determination. The predetermined time period may be information that is included in the usage condition information 22c, and is acquired from the server device 9 together with the app 22b.

The restriction unit 21e according to the second embodiment restricts usage of the app 22b, in the case where the position determination unit 21g determines that the position information of the vehicle 1 matches the specific position information or where the time period determination unit 21i determines that the elapsed time exceeds the predetermined time period, after the travel distance determination unit 21d determines that the travel distance of the vehicle 1 exceeds the threshold value.

Figure 5:
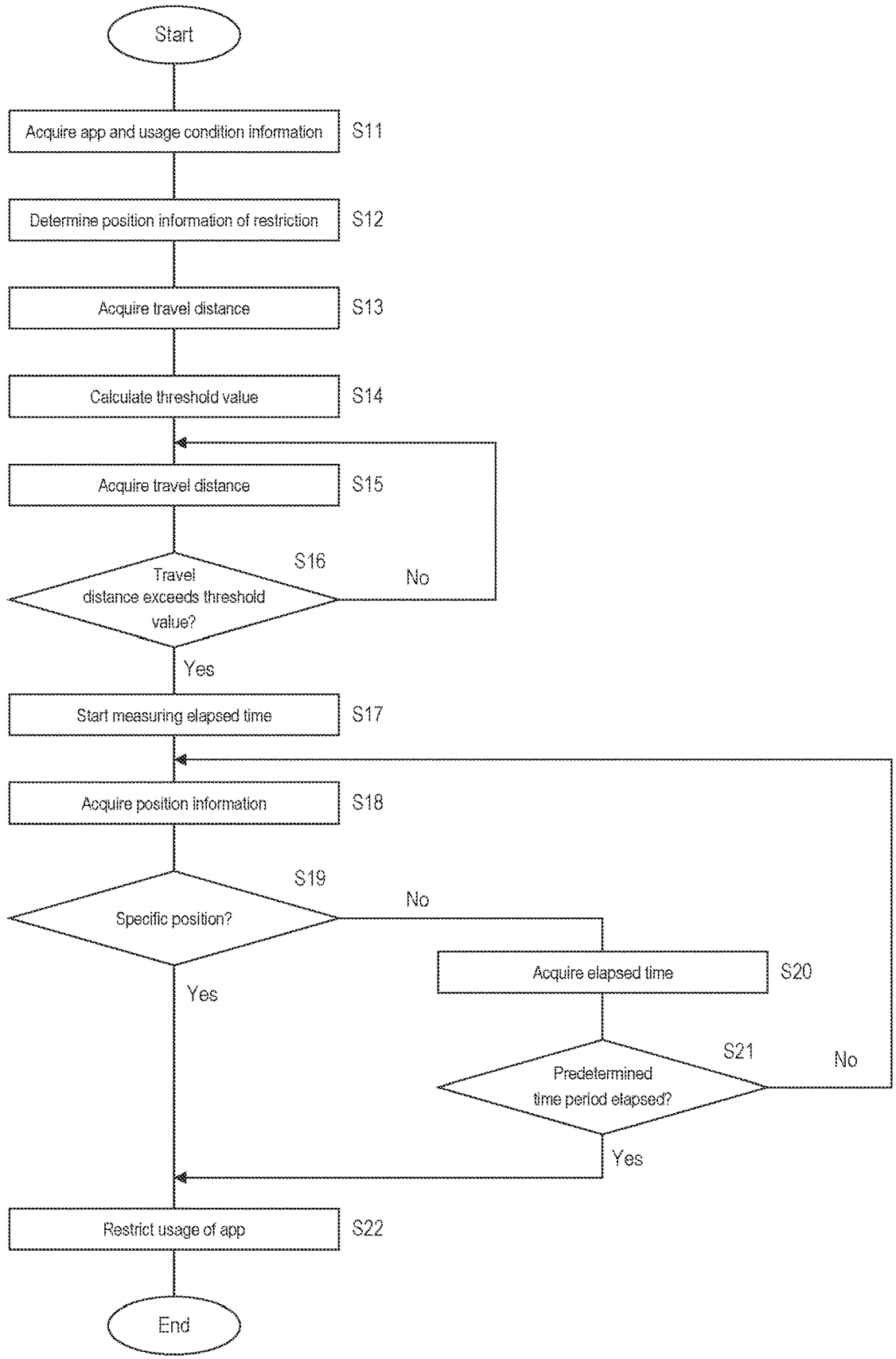
FIG. 5 is a flowchart showing the procedure of processing that is performed by the in-vehicle information processing apparatus according to the second embodiment.

FIG. 5 is a flowchart showing the procedure of processing performed by the in-vehicle information processing apparatus 2 according to the second embodiment. The app acquisition unit 21a of the processing unit 21 of the in-vehicle information processing apparatus 2 according to the second embodiment communicates with the server device 9 based on operations by the user, for example, and acquires the trial version app 22b and the usage condition information 22c of the app 22b from the server device 9 (step S11).

Next, the position determination unit 21g of the processing unit 21 determines specific position information to be used when determining whether to restrict usage of the app 22b (step S12). At this time, the position determination unit 21g may acquire the home position set in the car navigation device of the vehicle 1 and set the acquired home position as the specific position information, for example, or may receive input of position information of his or her home by the user and set the input position information as the specific position information, for example, or may set position information that is based on the GPS signals received by the GPS reception unit 26 at this point in time as the specific position information, for example.

The travel distance acquisition unit 21c of the processing unit 21 acquires, from the odometer 6 of the vehicle 1, the travel distance of the vehicle 1 at the point in time at which the trial version app 22b is acquired (step S13). The travel distance determination unit 21d of the processing unit 21 calculates a threshold value for performing determination of the travel distance related to usage restrictions, by setting the travel distance acquired in step S13 as the initial value and adding the distance for which the app 22b is usable prescribed in the usage condition information 22c to the initial value (step S14).

Thereafter, the travel distance determination unit 21d acquires the travel distance of the vehicle 1 from the odometer 6 (step S15). The travel distance determination unit 21d determines whether the travel distance acquired in step S15 exceeds the threshold value calculated in step S14 (step S16). If the travel distance does not exceed the threshold value (S16: NO), the processing unit 21 returns the processing to step S15, and repeats acquisition of the travel distance by the travel distance acquisition unit 21c and determination of the travel distance by the travel distance determination unit 21d. If the travel distance exceeds the threshold value (S16: YES), the elapsed time acquisition unit 21h of the processing unit 21 starts measuring the elapsed time with the timer (step S17).

The position information acquisition unit 21f of the processing unit 21 acquires the position information of the vehicle 1 that is based on the GPS signals received by the GPS reception unit 26 (step S18). The position determination unit 21g compares the position information of the vehicle 1 acquired in step S18 with the specific position information determined in step S12, and determines whether the position of the vehicle 1 is the specific position (step S19). If the position of the vehicle 1 is the specific position (S19: YES), the restriction unit 21e of the processing unit 21 restricts usage of the trial version app 22b acquired in step S11 (step S22), and ends the processing.

If the position of the vehicle 1 is not the specific position (S19: NO), the elapsed time acquisition unit 21h acquires the elapsed time that is measured by the timer (step S20). The time period determination unit 21i of the processing unit 21 determines whether a predetermined time period has elapsed from when the travel distance exceeds the threshold value, by determining whether the elapsed time acquired in step S20 exceeds the predetermined time period prescribed in the usage condition information 22c (step S21). If the predetermined time period has not elapsed (S21: NO), the processing unit 21 returns the processing to step S18, and repeats the determination that is based on the position information of the vehicle 1 and the determination that is based on the elapsed time. If the predetermined time period has elapsed (S21: YES), the restriction unit 21e restricts usage of the trial version app 22b acquired in step S11 (step S22), and ends the processing.

The in-vehicle information processing apparatus 2 according to the second embodiment having the above configuration acquires position information of the vehicle 1 and determines whether the acquired position information indicates a specific position. The in-vehicle information processing apparatus 2 restricts subsequent usage of the app 22b, in the case where it is determined that the travel distance of the vehicle 1 exceeds the threshold value, and it is determined that the position information of the vehicle 1 is the specific position. Adding the position information condition to the usage restrictions of the app 22b, rather than having only the travel distance condition, makes it is possible to prevent usage of the app 22b from being restricted due to the travel distance exceeding the threshold value while the vehicle 1 is traveling, for example.

Also, the in-vehicle information processing apparatus 2 according to the second embodiment acquires the elapsed time from the point in time at which it is determined that the travel distance of the vehicle 1 exceeds the threshold value, and determines whether the acquired elapsed time exceeds a predetermined time period. The in-vehicle information processing apparatus 2 restricts subsequent usage of the app 22b in the case where the elapsed time from when the travel distance exceeds the threshold value exceeds the predetermined time period, even if the position information of the vehicle 1 does not indicate the specific position. The in-vehicle information processing apparatus 2 is thereby able to prevent a state in which usage of the app 22b cannot be restricted due to the vehicle 1 not reaching the specific position from continuing for longer than necessary.

Note that the in-vehicle information processing apparatus 2 may be configured to not apply usage restrictions that are based on the elapsed time from when the travel distance exceeds the threshold value to the app 22b. Instead of restrictions based on elapsed time, the in-vehicle information processing apparatus 2 may restrict usage of the app 22b in the case where the travel distance of the vehicle 1 exceeds a second threshold value, for example.

Also, since the remaining configuration of the in-vehicle information processing system according to the second embodiment is similar to the in-vehicle information processing system according to the first embodiment, the same reference numerals are given to parts that are similar, and a detailed description thereof is omitted.

Each device in the in-vehicle information processing system is provided with a computer constituted to include a microprocessor, a ROM and a RAM. A computational processing unit such as a microprocessor may read out and execute a computer program including some or all of the steps of sequence diagrams or flowcharts, such as shown in FIGS. 3 and 5, from a storage unit such as the ROM or RAM. The computer programs of these plurality of devices can each be installed from an external server device or the like. Also, the computer programs of these plural devices are each distributed in a state of being stored in a recording medium such as a CD-ROM, DVD-ROM or semiconductor memory.

The embodiments disclosed herein are considered in all respects to be illustrative and not restrictive. The scope of the disclosure is defined by the claims rather than by the foregoing meaning, and all changes that come within the meaning and range of equivalency of the claims are intended to be embraced therein.

The invention claimed is:

1. An in-vehicle information processing apparatus to be mounted in a vehicle and for actuating a program for a trial basis, wherein the program is actuated by an actuation of an operation unit, the in-vehicle information processing apparatus comprising:
 a processing unit,
 wherein the processing unit
  processes the actuation of the operation unit so as to start the actuation of the program;
  determines whether a travel distance of the vehicle from when actuation of the program is started exceeds a threshold value,
  determines whether a location of the vehicle is a specific location, and
  when it is determined that the travel distance exceeds the threshold value, and it is determined that the vehicle is at the specific location, disables the program so as to end the trial basis rendering the program unusable.

2. The in-vehicle information processing apparatus according to claim 1, wherein the processing unit acquires the program and information relating to the threshold value from a device provided externally to the vehicle.

3. The in-vehicle information processing apparatus according to claim 2,
 wherein the processing unit
  determines whether an elapsed time from a point in time at which it is determined that the travel distance exceeds the threshold value exceeds a predetermined time period, and
  if it is determined that the elapsed time exceeds the predetermined time period, restricts subsequent execution of the program, even if it is not determined that the vehicle is at the specific location.

4. The in-vehicle information processing apparatus according to claim 1,
 wherein the processing unit
  determines whether an elapsed time from a point in time at which it is determined that the travel distance exceeds the threshold value exceeds a predetermined time period, and
  when it is determined that the elapsed time exceeds the predetermined time period, restricts subsequent actuation of the program, even if it is not determined that the vehicle is at the specific location.

5. The in-vehicle information processing apparatus according to claim 1, wherein the processing unit acquires the distance traveled from an odometer.

6. A program execution restriction method for restricting an actuation of a program by an in-vehicle information processing apparatus mounted in a vehicle, the method comprising:
 determining when the program has been actuated;
 determining whether a travel distance of the vehicle from when actuation of the program is started exceeds a threshold value;
 determining whether the vehicle is at a specific location, and
 preventing subsequent actuation of the program when it is determined that the travel distance exceeds the threshold value, and it is determined that the vehicle is at the specific location so as to disable the program from being actuated.

7. A computer program product mounted in a vehicle, the computer program product comprising a non-transitory, machine-readable medium storing instructions which, when executed by at least one programmable processor, cause the at least one programmable processor to perform operations comprising:
 determining when the program has been actuated;
 determining whether a travel distance of the vehicle from when usage of the program product is started exceeds a threshold value; and
 determining whether the vehicle is at a specific location, and
 if when it is determined that the travel distance exceeds the threshold value, and it is determined that the vehicle is at the specific location, disabling the computer program product.

* * * * *